(12) United States Patent
Halepovic et al.

(10) Patent No.: US 11,140,086 B2
(45) Date of Patent: Oct. 5, 2021

(54) MANAGEMENT OF BACKGROUND DATA TRAFFIC FOR 5G OR OTHER NEXT GENERATIONS WIRELESS NETWORK

(71) Applicants: AT&T INTELLECTUAL PROPERTY I, L.P., Atlanta, GA (US); THE BOARD OF TRUSTEES OF THE UNIVERSITY OF ILLINOIS, Urbana, IL (US)

(72) Inventors: Emir Halepovic, Somerset, NJ (US); Vijay Gopalakrishnan, Edison, NJ (US); Muhammad Usama Chaudhry, Milpitas, CA (US); Shanyu Zhou, Chicago, IL (US); Balajee Vamanan, Chicago, IL (US); Hulya Seferoglu, Chicago, IL (US)

(73) Assignees: AT&T INTELLECTUAL PROPERTY I, L.P., Atlanta, GA (US); THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 16/542,278

(22) Filed: Aug. 15, 2019

(65) Prior Publication Data
US 2021/0051105 A1    Feb. 18, 2021

(51) Int. Cl.
*H04W 72/04* (2009.01)
*H04L 12/851* (2013.01)
(Continued)

(52) U.S. Cl.
CPC ............ *H04L 47/24* (2013.01); *H04L 43/062* (2013.01); *H04L 43/0829* (2013.01); *H04L 43/0894* (2013.01); *H04L 47/6215* (2013.01)

(58) Field of Classification Search
CPC ... H04L 47/24; H04L 47/6215; H04L 43/062; H04L 43/0829; H04L 43/0894
See application file for complete search history.

(56) References Cited

U.S. PATENT DOCUMENTS 6,069,871 A   5/2000  Sharma et al.
6,311,056 B1 10/2001  Sandidge
(Continued)

FOREIGN PATENT DOCUMENTS

CA    2 189 488 C   10/2000
CA    2 589 161 A1   6/2006
(Continued)

OTHER PUBLICATIONS

Goma et al., "SmartAP: Practical WLAN Backhaul Aggregation", IFIP Wireless Days (WD), 2013, 7 pages.
(Continued)

*Primary Examiner* — Hassan Kizou
*Assistant Examiner* — Mahbubul Bar Chowdhury
(74) *Attorney, Agent, or Firm* — Amin, Turocy & Watson, LLP

(57) ABSTRACT

In various aspects, a system that comprises detecting a congestion event in a network that transmits a first group of data packets and a second group of data packets, wherein the detecting the congestion event comprises detecting the congestion event has initiated in response to a data packet throughput value of the network having been determined to have decreased below a threshold value; in response to the detecting of the congestion event, determine a transmission rate of the second group of data packets based on a transmission priority of the second group of data packets; determining a data packet dropping rate for the second group of data packets based on the transmission rate of the second group of data packets and a size of the first group of data (Continued)

packets and transmitting the second group of data packets utilizing the transmission rate and the data packet dropping rate.

20 Claims, 11 Drawing Sheets

(51) Int. Cl.
*H04L 12/26* (2006.01)
*H04L 12/863* (2013.01)

(56) References Cited

U.S. PATENT DOCUMENTS

| | | | |
|---|---|---|---|
| 6,424,624 B1* | 7/2002 | Galand | H04L 12/5601 |
| | | | 370/231 |
| 6,657,962 B1* | 12/2003 | Barri | H04L 47/10 |
| | | | 370/235 |
| 6,988,182 B2 | 1/2006 | Teachman et al. | |
| 7,149,291 B1* | 12/2006 | Deshpande | H04L 47/10 |
| | | | 379/112.01 |
| 7,478,381 B2 | 1/2009 | Roberts et al. | |
| 7,516,238 B2 | 4/2009 | Key et al. | |
| 7,574,706 B2 | 8/2009 | Meulemans et al. | |
| 7,577,981 B2 | 8/2009 | Clynes et al. | |
| 7,609,661 B2 | 10/2009 | Chae et al. | |
| 7,704,147 B2 | 4/2010 | Quraishi et al. | |
| 7,843,907 B1 | 11/2010 | Abou-Emara et al. | |
| 7,844,432 B1* | 11/2010 | Jones | H04L 47/32 |
| | | | 703/13 |
| 7,890,427 B1 | 2/2011 | Rao et al. | |
| 8,311,858 B2 | 11/2012 | Everett et al. | |
| 8,320,302 B2 | 11/2012 | Richeson et al. | |
| 8,340,099 B2 | 12/2012 | Black et al. | |
| 8,578,361 B2 | 11/2013 | Cassapakis et al. | |
| 8,694,824 B2 | 4/2014 | Howard et al. | |
| 8,868,696 B2 | 10/2014 | Lewis et al. | |
| 8,881,243 B2 | 11/2014 | Magyar et al. | |
| 8,893,110 B2 | 11/2014 | Kapadekar et al. | |
| 8,910,139 B2 | 12/2014 | Li et al. | |
| 9,058,238 B2 | 6/2015 | Hironaka | |
| 9,405,528 B2 | 8/2016 | Osterloh et al. | |
| 9,444,569 B2 | 9/2016 | Vannithamby et al. | |
| 10,122,607 B2 | 11/2018 | Luna et al. | |
| 2002/0191637 A1 | 12/2002 | Lee et al. | |
| 2004/0064577 A1* | 4/2004 | Dahlin | H04L 69/329 |
| | | | 709/235 |
| 2005/0190755 A1 | 9/2005 | Singh et al. | |
| 2006/0193287 A1 | 8/2006 | Ooshima et al. | |
| 2007/0015538 A1 | 1/2007 | Wang | |
| 2007/0169073 A1 | 7/2007 | O'Neill et al. | |
| 2007/0297375 A1 | 12/2007 | Bonta et al. | |
| 2008/0040777 A1 | 2/2008 | Aihara et al. | |
| 2008/0043625 A1* | 2/2008 | Cohen | H04L 67/104 |
| | | | 370/236 |
| 2008/0069138 A1* | 3/2008 | Acharya | H04L 47/522 |
| | | | 370/468 |
| 2010/0058421 A1 | 3/2010 | Hastings et al. | |
| 2011/0173598 A1 | 7/2011 | Cassapakis et al. | |
| 2011/0292800 A1 | 12/2011 | Flinta et al. | |
| 2012/0106342 A1* | 5/2012 | Sundararajan | H04L 47/2441 |
| | | | 370/235 |
| 2012/0120848 A1 | 5/2012 | Hegde et al. | |
| 2012/0231777 A1 | 9/2012 | Lewis et al. | |
| 2012/0233478 A1 | 9/2012 | Mucignat et al. | |
| 2012/0256009 A1 | 10/2012 | Mucignat et al. | |
| 2013/0201857 A1 | 8/2013 | Bhargava et al. | |
| 2013/0308513 A1 | 11/2013 | Jheng et al. | |
| 2014/0133296 A1 | 5/2014 | Johansson | |
| 2015/0089080 A1 | 3/2015 | Alsup | |
| 2015/0304459 A1 | 10/2015 | Pakula et al. | |
| 2016/0072929 A1 | 3/2016 | Alsup | |
| 2016/0094464 A1 | 3/2016 | Talat et al. | |
| 2016/0306620 A1 | 10/2016 | Mille et al. | |
| 2017/0099613 A1 | 4/2017 | Berggren et al. | |
| 2018/0067765 A1 | 3/2018 | Ra et al. | |
| 2019/0166057 A1* | 5/2019 | Gilson | H04L 47/12 |
| 2020/0120407 A1* | 4/2020 | Boyd | H04Q 11/0067 |

FOREIGN PATENT DOCUMENTS

| | | |
|---|---|---|
| CA | 2 646 146 A1 | 9/2007 |
| GB | 2 315 386 A | 1/1998 |
| KR | 2002-0034228 A | 5/2002 |
| WO | 00/17749 A1 | 3/2000 |
| WO | 2008/086231 A2 | 7/2008 |
| WO | 2016/171884 A1 | 10/2016 |

OTHER PUBLICATIONS

Bernardi et al., "Stix: A Goal-Oriented Distributed Management System for Large-Scale Broadband Wireless Access Networks", Proceedings of the 16th Annual International Conference on Mobile Computing and Networking, MobiCom, Sep. 20-24, 2010, 12 pages.
Davis, R.I., "Scheduling Slack Time in Fixed Priority Pre-emptive Systems", Proceedings Real-Time Systems Symposium, IEEE, 1993, 24 pages.
Lehoczky et al., "An Optimal Algorithm for Scheduling Soft-Aperiodic Tasks in Fixed-Priority Preemptive Systems", Proceedings Real-Time Systems Symposium, IEEE, 1992, pp. 110-123.
Jang et al., "Sustainable and Practical Firmware Upgrade for Wireless Access Point Using Password-Based Authentication", Sustainability, Aug. 31, 2016, pp. 1-17.
Tran et al., "Facilitation of Efficient Software Downloads for Vehicles", U.S. Appl. No. 15/193,685, filed Jun. 27, 2016, 80 pages.
Rossi et al., "LEDBAT: the new BitTorrent congestion control protocol", Proceedings of 19th International Conference on Computer Communications and Networks, Aug. 2-5, 2010, 6 pages.
Non-Final Office Action received for U.S. Appl. No. 15/446,797 dated May 9, 2018, 30 pages.
Final Office Action received for U.S. Appl. No. 15/446,797 dated Oct. 9, 2018, 25 pages.
Notice of Allowance received for U.S. Appl. No. 15/446,797 dated Mar. 8, 2019, 30 pages.
Kuzmanovic et al., "TCP-LP: Low-Priority Service via End-Point Congestion Control", IEEE/ACM Transactions on Networking (TON), vol. 14, No. 4, Aug. 2006, pp. 1-14.
Carofiglio et al., "A hands-on Assessment of Transport Protocols with Lower than Best Effort Priority", 35th IEEE Conference on Local Computer Networks, Oct. 11-14, 2010, 9 pages.
Winstein et al., "Stochastic Forecasts Achieve High Throughput and Low Delay over Cellular Networks", Proceedings of the 10th USENIX Symposium on Networked Systems Design and Implementation, Apr. 2-5, 2013, pp. 459-471.
Office Action for U.S. Appl. No. 16/434,277 dated Mar. 30, 2020, 32 pages.
Non-Final Office Action received for U.S. Appl. No. 16/385,782 dated Apr. 6, 2020, 18 pages.
Kouvatsos, Demetres, "Mobility Management and Quality-of-service for Heterogeneous Networks", published Apr. 14, 2009, River Publishers Series in Information Science and Technology, pp. 418-420 (Year 2009).
Final Office Action received for U.S. Appl. No. 16/434,277 dated Aug. 25, 2020, 25 pages.
Notice of Allowance received for U.S. Appl. No. 16/434,277 dated Nov. 17, 2020, 40 pages.

* cited by examiner

MANAGEMENT OF BACKGROUND DATA TRAFFIC FOR 5G OR OTHER NEXT GENERATIONS WIRELESS NETWORK

STATEMENT OF GOVERNMENTAL INTEREST

This invention was made with government support under contract number W911NF-18-2-0181 awarded by the US Army Research Laboratory and grant number 1801708 awarded by the National Science Foundation. The government has certain rights in this invention.

TECHNICAL FIELD

This disclosure relates generally to managing data traffic in wireless communication systems. More specifically, facilitating management of background data traffic during congestion event or data traffic overload event, e.g., for 5th generation (5G) or other next generation wireless network.

BACKGROUND 5G wireless systems represent a next major phase of mobile telecommunications standards beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. In 5G and other 4G/LTE technologies, large variety of time-sensitive (e.g., foreground—web browsing) data traffic and time-insensitive (e.g., background—software updates) compete for network resources, for specifically for the downlink. When there is large amount of demand for network resources, the network gets overloaded or congested, thereby providing low quality user experience.

The above-described background relating to congestion in the network and classification of data traffic, is merely intended to provide a contextual overview of some current issues, and is not intended to be exhaustive (e.g., although problems and solution are directed to next generation networks such as 5G, the solutions can be applied to 4G/LTE technologies). Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
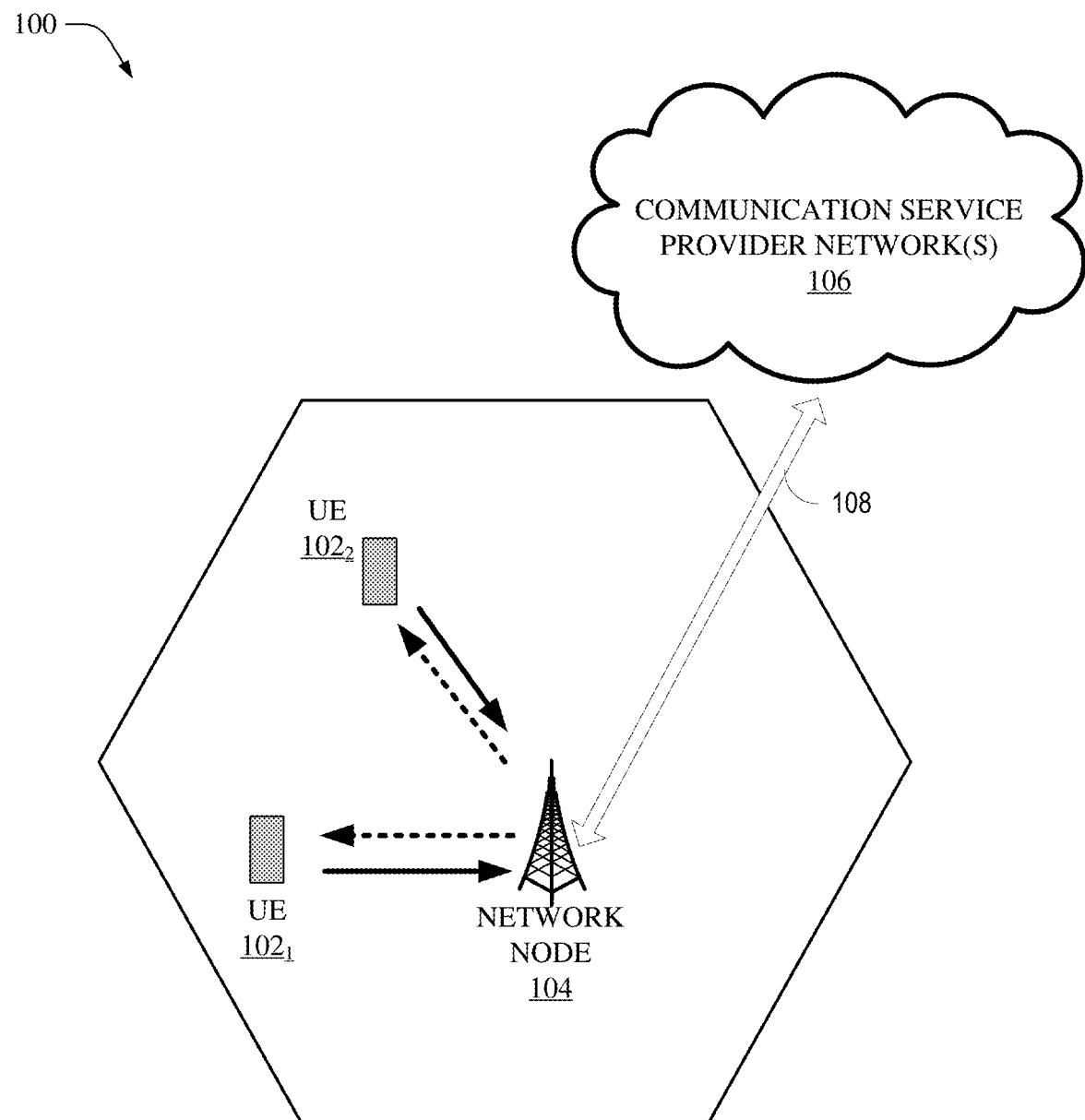
FIG. 1 illustrates an example wireless communication system in which a network node device and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate management of background data traffic. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or other LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate management of background data traffic during congestion event or data traffic overload event an initial connection with a network device. Facilitating management of background data traffic can be implemented in connection with any type of device with a connection to the communications network (e.g., a mobile handset, a computer, a handheld device, etc.) any Internet of Things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node device, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, evolved Node B (eNB or eNodeB), next generation Node B (gNB or gNodeB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller (e.g., controller, central controller, or centralized unit) that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

In communication system such as LTE or LTE-NR, management of network resource is important. Various new types of applications (e.g., software updates, cloud sync, social media downloads, etc.) are starting to compete with existing applications (e.g., web browsing, video streaming, etc.) for network resources (e.g., cellular bandwidth). An increase in network resources can cause congestion in the network and slow down throughput. In some embodiments, to address the congestion, the data traffic is managed by partitioning the traffic flow into two or more classes, for example foreground traffic (e.g., foreground flows—time-sensitive data traffic) and background traffic (e.g., background flows—time-insensitive data traffic). The classification can be independent of application running on or off screen at the user devices (e.g., mobile handsets or communication devices), and can be performed by the either end hosts, network, or content providers. Additional classes can be implemented if the congestion continues in the network. During congestion event or data traffic overload, the foreground traffic scheduling is prioritized over all classes while the background traffic is scheduled to utilize any spare resources.

According to some embodiments, a data packet management (DPM) system is utilized that achieves a high network utilization and high throughput for background flows, without affecting foreground flows. The DPM ensures that background flows quickly yield to foreground flows when the network is congested and quickly recapture spare capacity (e.g., network resources or bandwidth) when the network becomes lightly loaded. In some embodiments, the DPM system implements a random data packet dropping scheme to maintain the prioritization, wherein the background flow packets are dropped based on dropping rate. The dropping rate is based on size (e.g., load) of the foreground flows and an optimal transmission rate of the background flows. The DPM evaluates scheduler functionality to determine the optimal transmission rate for the background flows. Using the optimal transmission rate, the optimal data packet dropping rate for the background flows is determined. The optimal transmission rate depends on channel capacity and the amount of foreground traffic. Although, the foreground flows are given a higher priority and may have higher data rate, the optimal transmission rate and the dropping rate are determined to prevent background flows from timing out. A dropping probability utilized that yields to foreground traffic yet prevents/avoids background flows from timing out. In some embodiments, although foreground traffic may be high, the background flows allocated network resources for transmitting data packets. A tuning system is utilized to adjust network resource to achieve a transmission rate that keeps the background flow alive during network congestion. A packet dropping policy is implemented in queues to enable per-flow differentiation. For example, where there are more than one background flows, each background flow may have a different dropping rate based on the packet dropping policy which can be based on foreground flows and number of background flows.

According to an embodiment, a system can comprise a processor and a memory that stores executable instructions that, when executed by the processor, facilitate performance of operations comprising detecting a congestion event in a network that transmits a first group of data packets and a second group of data packets, wherein the detecting the congestion event comprises detecting the congestion event has initiated in response to a data packet throughput value of the network having been determined to have decreased below a threshold value. The system can further facilitate in response to the detecting of the congestion event, determining a transmission rate of the second group of data packets based on a transmission priority of the second group of data packets. The system can facilitate, determining a data packet dropping rate for the second group of data packets based on the transmission rate of the second group of data packets and a size of the first group of data packets. The system can further facilitate transmitting the second group of data packets utilizing the transmission rate and the data packet dropping rate.

According to another embodiment, described herein is a method that can comprise determining, by a device comprising a processor, a data traffic load value of a network that transmits a first group of data packets in accordance to a first initial transmission rate and a second group of data packets in accordance to a second initial transmission rate. The method can further comprise based on a first result of analyzing the data traffic load value and a threshold, determining, by the device, that the data traffic load value is above the threshold, assigning, by the device, a second transmission rate for transmission for the second group of data packets based on a first transmission priority of the second group of data packets, wherein the second transmission rate is lower than the second initial transmission rate and determining, by the device, a data packet dropping rate for the second group of data packets based on the second transmission rate of the second group of data packets and a size of the first group of data packets. The method can further comprise transmitting, by the device, the second group of data packets utilizing the second transmission rate and the data packet dropping rate.

According to yet another embodiment, a device can comprise a processor and a memory that stores executable instructions that, when executed by the processor, facilitate performance of operations comprising detecting a congestion event in a network that transmits a first group of data packets in accordance to a first initial transmission rate and transmits a second group of data packets in accordance to a second initial transmission rate, wherein the detecting the congestion event comprises detecting the congestion event has initiated in response to a data packet throughput value of the network having been determined to have decreased below a threshold value. The device can further comprise in response to the detecting of the congestion event, assigning a second transmission rate for the second group of data packets, wherein the second transmission rate is based on a transmission priority of the second group of data packet. The device can further comprise determining a data packet dropping rate for the second group of data packets based on the second transmission rate of the second group of data packets and a size of the first group of data packets. The device can further comprise transmitting the second group of data packets utilizing the second transmission rate and the data packet dropping rate.

These and other embodiments or implementations are described in more detail below with reference to the drawings. Repetitive description of like elements employed in the figures and other embodiments described herein is omitted for sake of brevity.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, pico-cell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
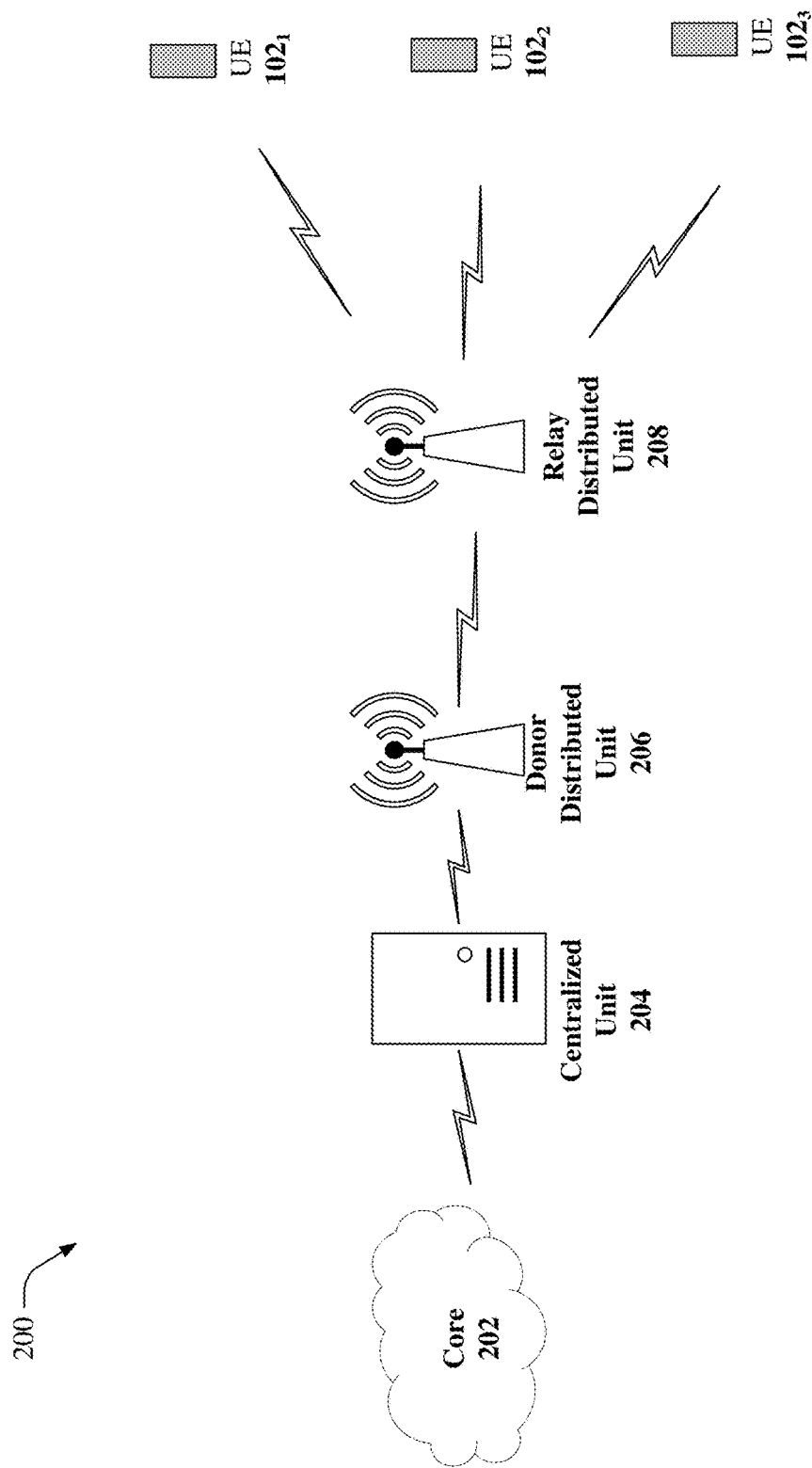
FIG. 2 illustrates an example schematic system block diagram of integrated access and backhaul links according to one or more embodiments.

Referring now to FIG. 2, illustrated is an example schematic system block diagram of integrated access and backhaul links according to one or more embodiments. For example, the network 200, as represented in FIG. 2 with integrated access and backhaul links, can allow a relay node to multiplex access and backhaul links in time, frequency, and/or space (e.g. beam-based operation). Thus, FIG. 2 illustrates a generic IAB set-up comprising a core network 202, a centralized unit 204, a donor distributed unit 206, a relay distributed unit 208, and UEs $102_1$, $102_2$, $102_3$. The donor distributed unit 206 (e.g., access point) can have a wired backhaul with a protocol stack and can relay the user traffic for the UEs $102_1$, $102_2$, $102_3$ across the IAB and backhaul link. Then the relay distributed unit 208 can take the backhaul link and convert it into different strains for the connected UEs $102_1$, $102_2$, $102_3$. Although FIG. 2 depicts a single hop (e.g., over the air), it should be noted that multiple backhaul hops can occur in other embodiments.

The relays can have the same type of distributed unit structure that the gNode B has. For 5G, the protocol stack can be split, where some of the stack is centralized. For example, the PDCP layer and above can be at the centralized unit 204, but in a real time application part of the protocol stack, the radio link control (RLC), the medium access control (MAC), and the physical layer PHY can be co-located with the base station wherein the system can comprise an F1 interface. In order to add relaying, the F1 interface can be wireless so that the same structure of the donor distributed unit 206 can be kept.

Figure 3:
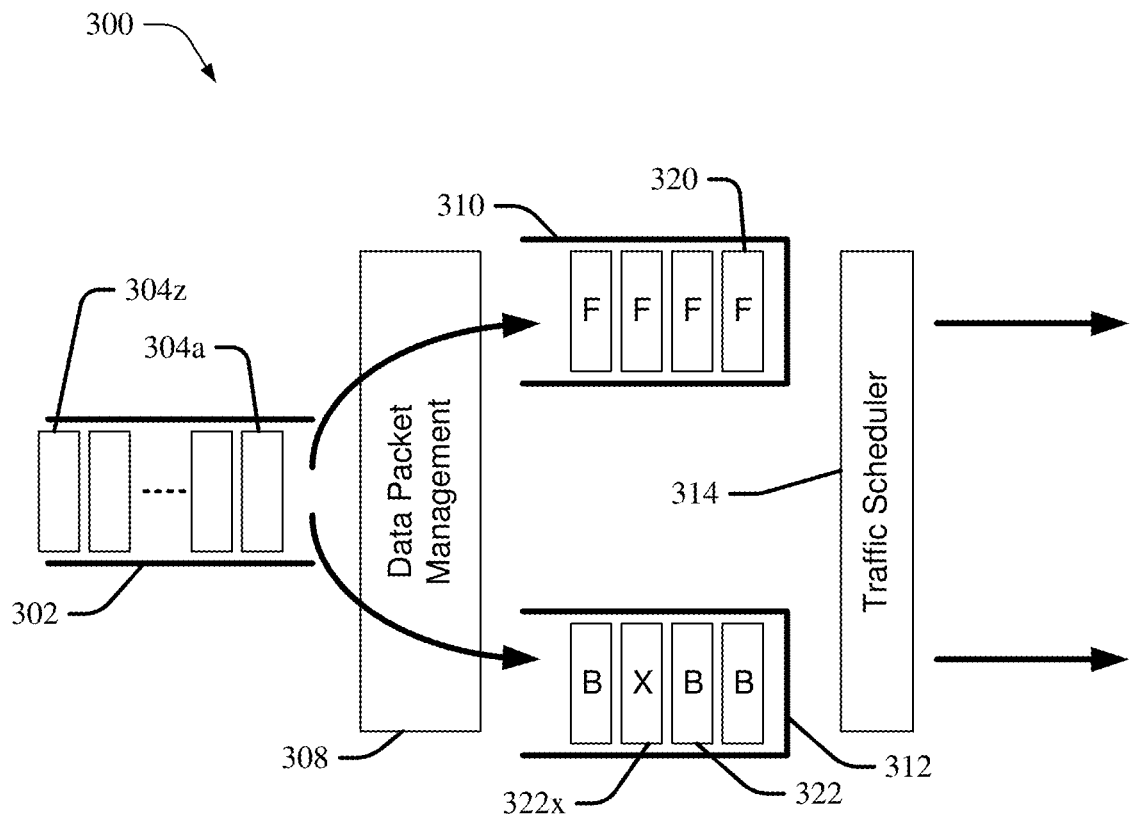
FIG. 3 illustrates an example of communication system comprising a data packet management system in accordance with various aspects and embodiments described herein.

FIG. 3, illustrates an example of communication system 300 comprising a data packet management system 308 in accordance with various aspects and embodiments described herein. In the exemplary communication system, all incoming data traffic queued a first come first serve in an incoming traffic queue 302. The incoming data traffic is organized by data packets 304a-z and classified as either foreground or background data packets. The data packets 304a-z are provided to data packet management system 308 for further organize the data packets 304a-z into foreground flows and background flows. The data packet management system 308 can analyze each data packet of the data packets 304a-z to place a data packet associated with foreground 320 into a foreground data packet queue 310 and place a data packet associated with background 322 into a background data packet queue 312. As described herein, a data packet dropping scheme is utilized to achieve an optimal transmission rate such that the background flows do not time out. As illustrated, data packet 322x is identified as the data packet that will be dropped if the network (e.g., base station or e/gNB) is congested. A traffic scheduler 314 will transmit the data packets queued in the foreground queue 310 and background queue 312 based on priority and transmission rate. Without any congestion, the transmission of the data packets queued in the foreground queue 310 will have higher priority than the data packets queued in the background queue 312, wherein the traffic scheduler 314 will transmit the data packets (e.g., data packet 322) queued in the background queue 312 at an initial transmission rate that is lower than transmission rate for data packets queued in foreground queue 310. In event of congestion, the transmission of the data packets queued in the background queue 310 will be transmitted at lower transmission rate than the initial transmission rate (e.g., yield to the foreground flows). Based on the transmission rate, some data packets (e.g., data packet 322x) will get dropped.

Figure 4:
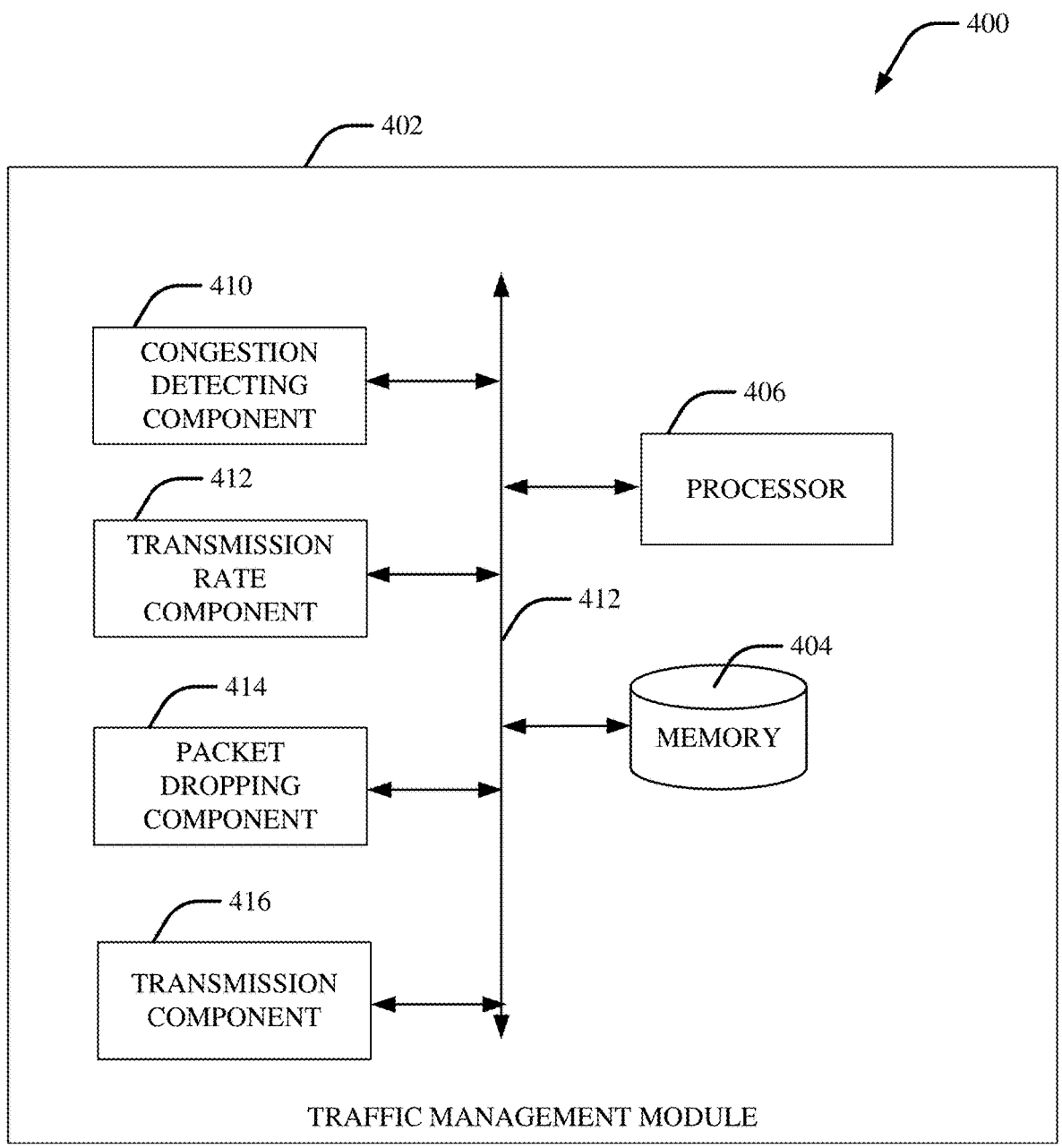
FIG. 4 illustrates a block diagram of an example, non-limiting system 400 that facilitates management of background data traffic in accordance with one or more embodiments described herein.

FIG. 4 illustrates a block diagram of an example, non-limiting system 400 that facilitates management of background data traffic in accordance with one or more embodiments described herein. According to some embodiments, the system 400 can comprise a traffic management module 402. In some embodiments, the traffic management module 402 can also include or otherwise be associated with a memory 404, a processor 406 that executes computer executable components stored in a memory 404. The traffic management module 402 can further include a system bus 408 that can couple various components including, but not limited to, a congestion detecting component 410, a transmission rate component 412, a packet dropping component 414, and a transmission component 416.

Aspects of systems (e.g., the traffic management module 402 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the traffic management module 402 can comprise various computer and/or computing-based elements described herein with reference to operating environment 1100 and FIG. 11. In several embodiments, such computer and/or computing-based elements can be used in connection with implementing one or more of the systems, devices, and/or components shown and described in connection with FIG. 4 or other figures disclosed herein.

The memory 404 can store one or more computer and/or machine readable, writable, and/or executable components and/or instructions that, when executed by processor 406, can facilitate performance of operations defined by the executable component(s) and/or instruction(s). For example, the memory 404 can store computer and/or machine readable, writable, and/or executable components and/or instructions that, when executed by the processor 406, can facilitate execution of the various functions described herein relating to the congestion detecting component 410, the transmission rate component 412, the packet dropping component 414, and the transmission component 416.

In several embodiments, the memory 404 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 404 are described below with reference to system memory 1106 and FIG. 11. Such examples of memory 404 can be employed to implement any embodiments of the subject disclosure.

According to some embodiments, the processor 406 can comprise one or more types of processors and/or electronic circuitry that can implement one or more computer and/or machine readable, writable, and/or executable components and/or instructions that can be stored on the memory 404. For example, the processor 406 can perform various operations that can be specified by such computer and/or machine readable, writable, and/or executable components and/or instructions including, but not limited to, logic, control, input/output (I/O), arithmetic, and/or the like. In some embodiments, processor 406 can comprise one or more central processing unit, multi-core processor, microprocessor, dual microprocessors, microcontroller, System on a Chip (SOC), array processor, vector processor, and/or another type of processor.

In some embodiments, the processor 406, the memory 404, the congestion detecting component 410, the transmission rate component 412, the packet dropping component 414, and the transmission component 416 can be communicatively, electrically, and/or operatively coupled to one another via the system bus 408 to perform functions of the traffic management module 402, and/or any components coupled therewith. In several embodiments, the system bus 408 can comprise one or more memory bus, memory controller, peripheral bus, external bus, local bus, and/or another type of bus that can employ various bus architectures.

In several embodiments, the traffic management module 402 can comprise one or more computer and/or machine readable, writable, and/or executable components and/or instructions that, when executed by the processor 406, can facilitate performance of operations defined by such component(s) and/or instruction(s). Further, in numerous embodiments, any component associated with the traffic management module 402, as described herein with or without reference to the various figures of the subject disclosure, can comprise one or more computer and/or machine readable, writable, and/or executable components and/or instructions that, when executed by the processor 406, can facilitate performance of operations defined by such component(s) and/or instruction(s). For example, the receiving component 410, and/or any other components associated with the traffic management module 402 (e.g., communicatively, electronically, and/or operatively coupled with and/or employed by the traffic management module 402), can comprise such computer and/or machine readable, writable, and/or executable component(s) and/or instruction(s). Consequently, according to numerous embodiments, the traffic management module 402 and/or any components associated therewith, can employ the processor 406 to execute such computer and/or machine readable, writable, and/or executable component(s) and/or instruction(s) to facilitate performance of one or more operations described herein with reference to the traffic management module 402 and/or any such components associated therewith.

In some embodiments, the traffic management module 402 can facilitate performance of operations related to and/or executed by the components of traffic management module 402, for example, the processor 406, the memory 404, the congestion detecting component 410, the transmission rate component 412, the packet dropping component 414, and the transmission component 416. For example, as described in detail below, the traffic management module 402 can facilitate: detecting (e.g., by the congestion detecting component 410) a congestion event in a network that transmits a first group of data packets and a second group of data packets, wherein the detecting the congestion event comprises detecting the congestion event has initiated in response to a data packet throughput value of the network having been determined to have decreased below a threshold value; in response to the detecting of the congestion event, determining (e.g., by the transmission rate component 412) a transmission rate of the second group of data packets based on a transmission priority of the second group of data packets; determining (e.g., by the packet dropping component 414) a data packet dropping rate for the second group of data packets based on the transmission rate of the second group of data packets and a size of the first group of data packets; and transmitting (e.g., the transmission component 416) the second group of data packets utilizing the transmission rate and the data packet dropping rate.

In some embodiments, the congestion detecting component 410, can comprise one or more processors, memory, and electrical circuitry. The congestion detecting component 410 detects a congestion event in a network that transmits a first group of data packets and a second group of data packets, wherein the detecting the congestion event comprises detecting the congestion event has initiated in response to a data packet throughput value of the network having been determined to have decreased below a threshold value. A congestion in network traffic can occur when an above normal number of data packets are queued for transmission. This can occur when the UE's attached to a network node device (e.g., base station) are transmitting large amounts of data. The congestion event is trigged/initiated when throughput of data packets falls below a threshold (e.g., the threshold value can be scheduled by the operators and based on capabilities of the base station and network configuration).

In some embodiments, the transmission rate component 412, can comprise one or more processors, memory, and electrical circuitry. The transmission rate component 412, in response to the detecting of the congestion event, determines a transmission rate of the second group of data packets based on a transmission priority of the second group of data packets. As described herein, when a congestion event is detected, the all the packets are classified. For example, some data packets will be classified into two or more flows. In some embodiments, a first group data packets are classified as foreground flow data packets and a second group of data packets (e.g., foreground flows—first group of data packets) are classified as background flow data packets (e.g., background flows—second group of data packets). During the congestion event, an optimal transmission rate is calculated based on transmission priority of background flow data packets (e.g., which is set to be lower than the foreground flow data packets). In some embodiments, the optimal transmission rate prevents timeouts during transmission of the background flow data packets yet allowing the foreground flow data packets to be delivered with high priority. In some embodiments, the transmission rate can be based on channel capacity and amount of foreground traffic.

In some embodiments, the packet dropping component 414, can comprise one or more processors, memory, and electrical circuitry. The packet dropping component 414, determines a data packet dropping rate for the second group of data packets based on the transmission rate of the second group of data packets and a size of the first group of data packets. In some embodiments, in order to avoid background flows from timing out, an optimal dropping rate is determined. In some embodiments, the optimal dropping rate may be determined using various algorithms and machine learning systems. In some embodiment, optimal packet dropping rate is determined and a maximum packet drop is determined. Using the maximum drop rate, the system can ensure that even when foreground traffic is high, the background flow still gets some resources for transmitting their packets. Using a tuning mechanism and machine learning systems, the amount of resources allocated to the background traffic can be adjusted. The amount of resources allocated for transmission of background data packets is based on priority of background data packets and amount of foreground data packets to be transmitted. In some embodiments, a practical dropping rate is determined wherein the packet dropping rate is below a maximum drop rate. The advantage of keeping the packet dropping rate below a maximum drop rate is that the system is able to transmit both the foreground data packets and background data packets. For example, a minimum number of background data packets will get transmitted because the system, selecting a practical dropping rate, the system did not drop all the background data packets (e.g., avoided causing a timeout for background flow).

In some embodiments, the transmission component 416, can comprise one or more processors, memory, and electrical circuitry. The transmission component 416, transmits the second group of data packets utilizing the transmission rate and the data packet dropping rate. Upon determining the transmission rate for the background flows data packets and a dropping rate, the background flow data packets are transmitted utilizing the transmission rate and the dropping rate. In some examples, based on the dropping rate, one of more data packets is randomly selected and dropped from transmission. The advantage of dropping data packets from transmission is that, the base station can maintain a high level of throughput for time-sensitive data traffic (e.g., foreground flows) while keeping the background flow alive (e.g., preventing timeout) by transmitting background flow at lower rate. In some embodiments, the dropped data packets can be rescheduled for transmission and stitched together by the recipient device.

Figure 5:
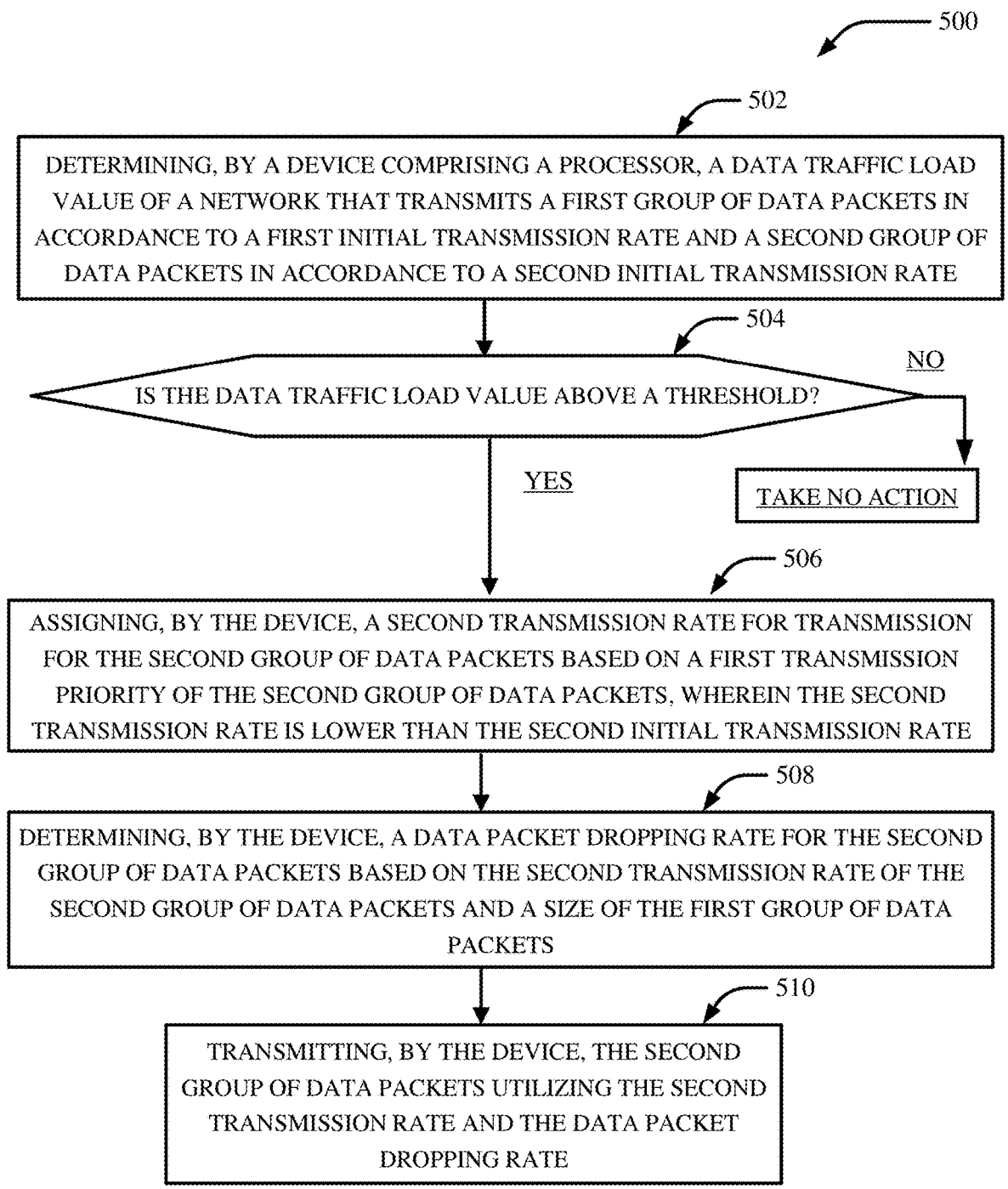
FIG. 5 depicts a diagram of an example, non-limiting computer implemented method that facilitates management of background data traffic in accordance with one or more embodiments described herein.

FIG. 5 depicts a diagram of an example, non-limiting computer implemented method that facilitates management of background data traffic in accordance with one or more embodiments described herein. In some examples, flow diagram 500 can be implemented by operating environment 1100 described below. It can be appreciated that the operations of flow diagram 500 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 5.

Operation 502 depicts determining, by a device comprising a processor, a data traffic load value of a network that transmits a first group of data packets in accordance to a first initial transmission rate and a second group of data packets in accordance to a second initial transmission rate. Operation 504 depicts determining, by the device, if the data traffic load value is above the threshold (e.g., is the data traffic load value above a threshold). If based on a first result of analyzing the data traffic load value and a threshold, determining, by the device, that the data traffic load value is above the threshold, then perform operation 506. Otherwise, take no action and continue monitoring. Operation 506 depicts assigning, by the device, a second transmission rate for transmission for the second group of data packets based on a first transmission priority of the second group of data packets, wherein the second transmission rate is lower than the second initial transmission rate. Operation 508 depicts determining, by the device, a data packet dropping rate for the second group of data packets based on the second transmission rate of the second group of data packets and a size of the first group of data packets. Operation 510 depicts transmitting, by the device, the second group of data packets utilizing the second transmission rate and the data packet dropping rate.

Figure 6:
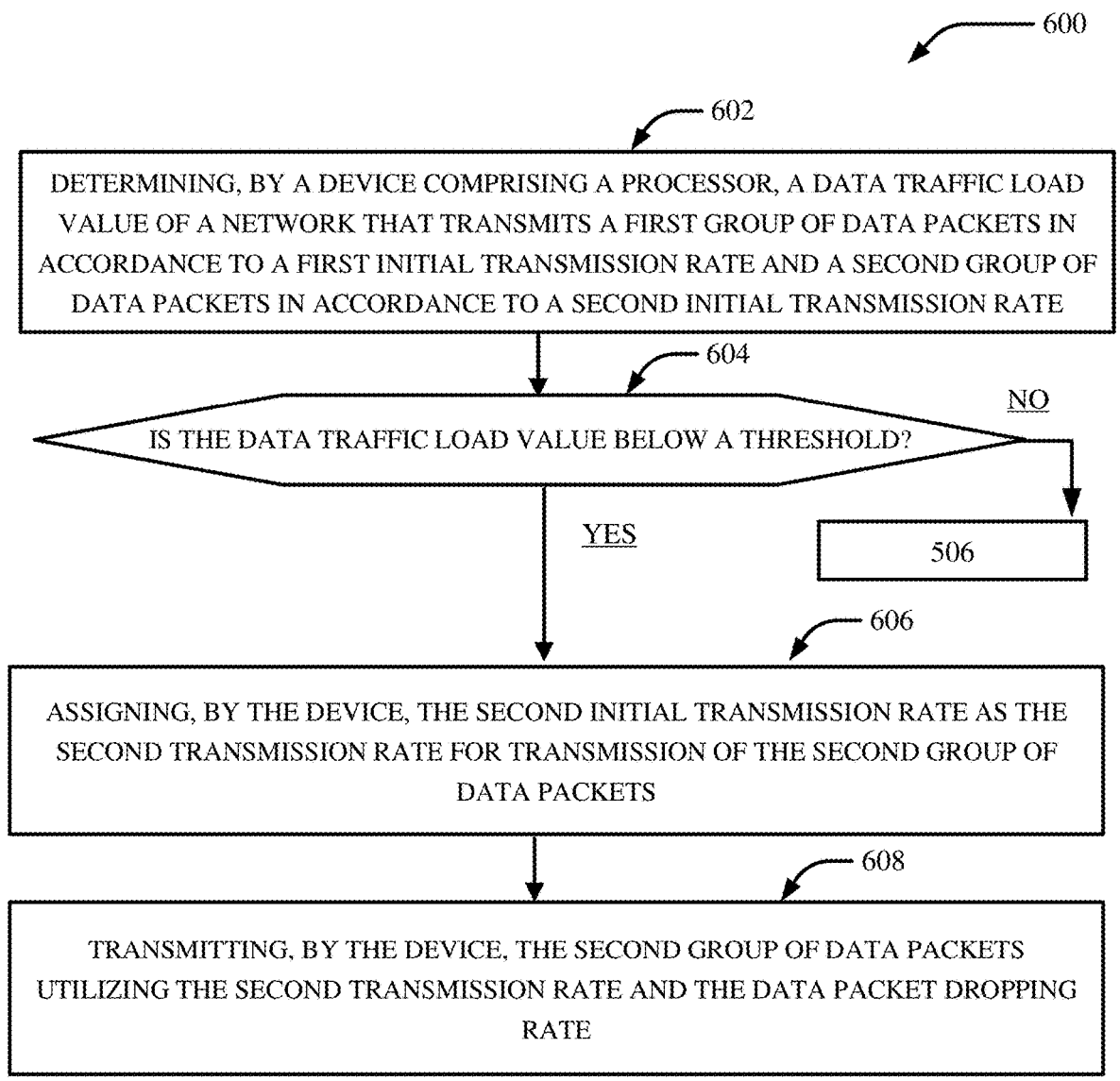
FIG. 6 depicts a diagram of an example, non-limiting computer implemented method that facilitates management of background data traffic in accordance with one or more embodiments described herein.

FIG. 6 depicts a diagram of an example, non-limiting computer implemented method that facilitates management of background data traffic in accordance with one or more embodiments described herein. In some examples, flow diagram 600 can be implemented by operating environment 1100 described below. It can be appreciated that the operations of flow diagram 600 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts determining, by a device comprising a processor, a data traffic load value of a network that transmits a first group of data packets in accordance to a first initial transmission rate and a second group of data packets in accordance to a second initial transmission rate. Operation 604 depicts determining, by the device, if the data traffic load value is below the threshold (e.g., is the data traffic load value below a threshold). If based on a first result of analyzing the data traffic load value and a threshold, determining, by the device, that the data traffic load value is below the threshold, then perform operation 606. Otherwise, perform operation 506 of FIG.5. Operation 606 depicts assigning, by the device, the second initial transmission rate as the second transmission rate for transmission of the second group of data packets. Operation 608 depicts transmitting, by the device, the second group of data packets utilizing the second transmission rate and the data packet dropping rate.

Figure 7:
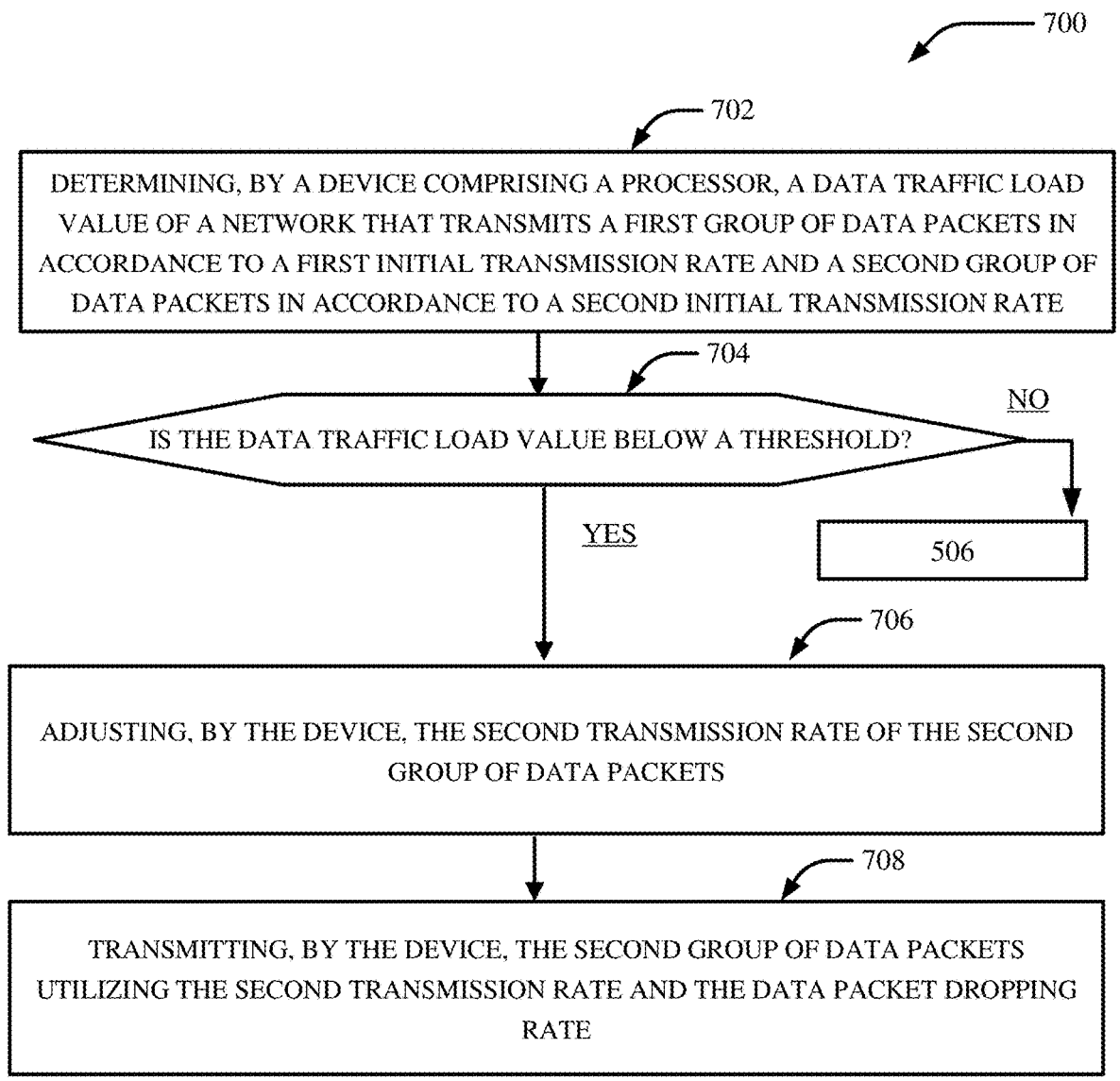
FIG. 7 depicts a diagram of an example, non-limiting computer implemented method that facilitates management of background data traffic in accordance with one or more embodiments described herein.

FIG. 7 depicts a diagram of an example, non-limiting computer implemented method that facilitates management of background data traffic in accordance with one or more embodiments described herein. In some examples, flow diagram 700 can be implemented by operating environment 1100 described below. It can be appreciated that the operations of flow diagram 700 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts determining, by a device comprising a processor, a data traffic load value of a network that transmits a first group of data packets in accordance to a first initial transmission rate and a second group of data packets in accordance to a second initial transmission rate. Operation 704 depicts determining, by the device, if the data traffic load value is below the threshold (e.g., is the data traffic load value below a threshold). If based on a first result of analyzing the data traffic load value and a threshold, determining, by the device, that the data traffic load value is below the threshold, then perform operation 706. Otherwise, perform operation 506 of FIG. 5. Operation 706 depicts adjusting, by the device, the second transmission rate of the second group of data packets. Operation 708 depicts transmitting, by the device, the second group of data packets utilizing the second transmission rate and the data packet dropping rate.

Figure 8:
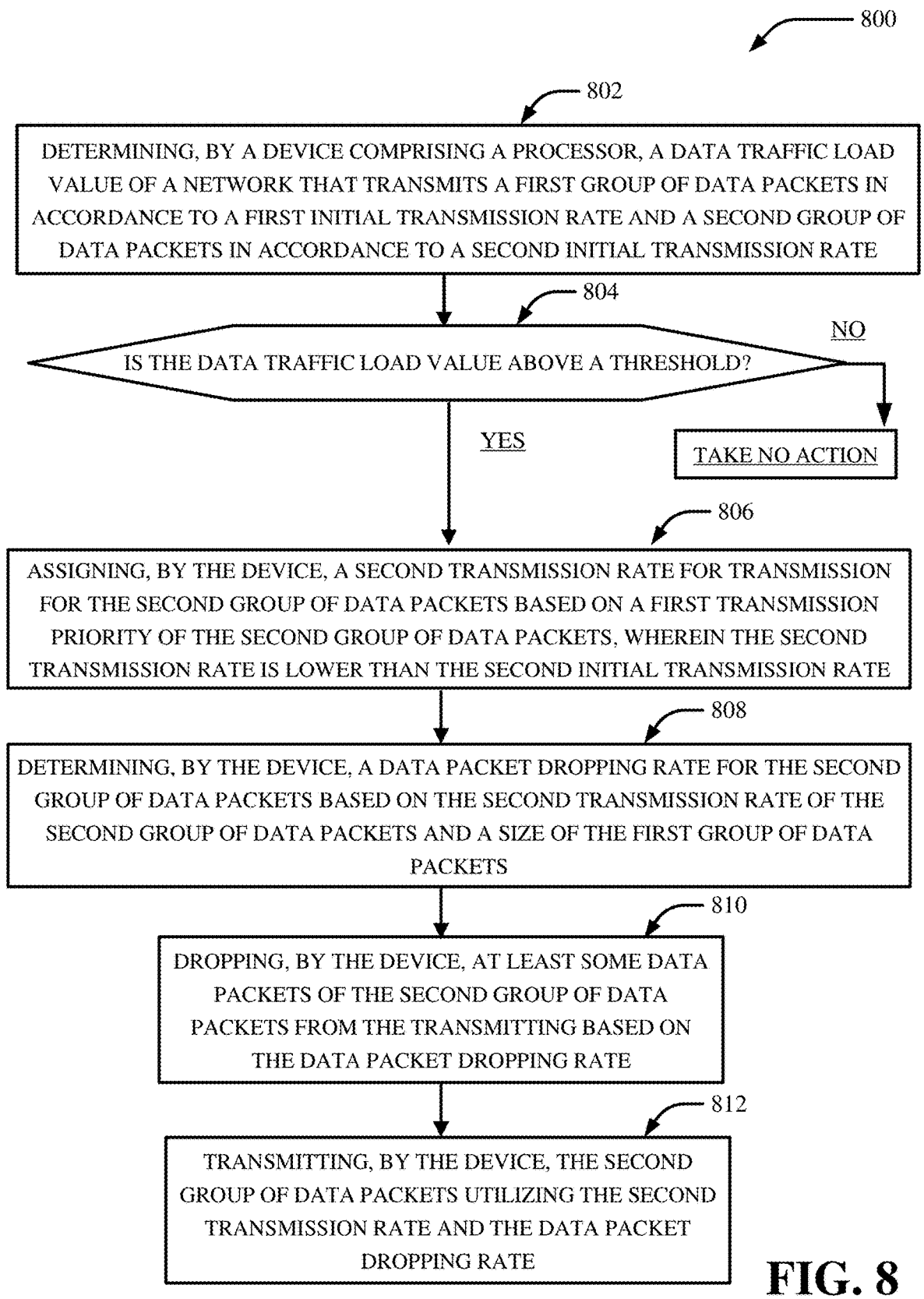
FIG. 8 depicts a diagram of an example, non-limiting computer implemented method that facilitates management of background data traffic in accordance with one or more embodiments described herein.

FIG. 8 depicts a diagram of an example, non-limiting computer implemented method that facilitates management of background data traffic in accordance with one or more embodiments described herein. In some examples, flow diagram 800 can be implemented by operating environment 1100 described below. It can be appreciated that the operations of flow diagram 800 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts determining, by a device comprising a processor, a data traffic load value of a network that transmits a first group of data packets in accordance to a first initial transmission rate and a second group of data packets in accordance to a second initial transmission rate. Operation 804 depicts determining, by the device, if the data traffic load value is above the threshold (e.g., is the data traffic load value above a threshold). If based on a first result of analyzing the data traffic load value and a threshold, determining, by the device, that the data traffic load value is above the threshold, then perform operation 806. Otherwise, take no action and continue monitoring. Operation 806 depicts assigning, by the device, a second transmission rate for transmission for the second group of data packets based on a first transmission priority of the second group of data packets, wherein the second transmission rate is lower than the second initial transmission rate. Operation 808 depicts determining, by the device, a data packet dropping rate for the second group of data packets based on the second transmission rate of the second group of data packets and a size of the first group of data packets. Operation 810 depicts dropping, by the device, at least some data packets of the second group of data packets from the transmitting based on the data packet dropping rate. Operation 812 depicts transmitting, by the device, the second group of data packets utilizing the second transmission rate and the data packet dropping rate.

Figure 9:
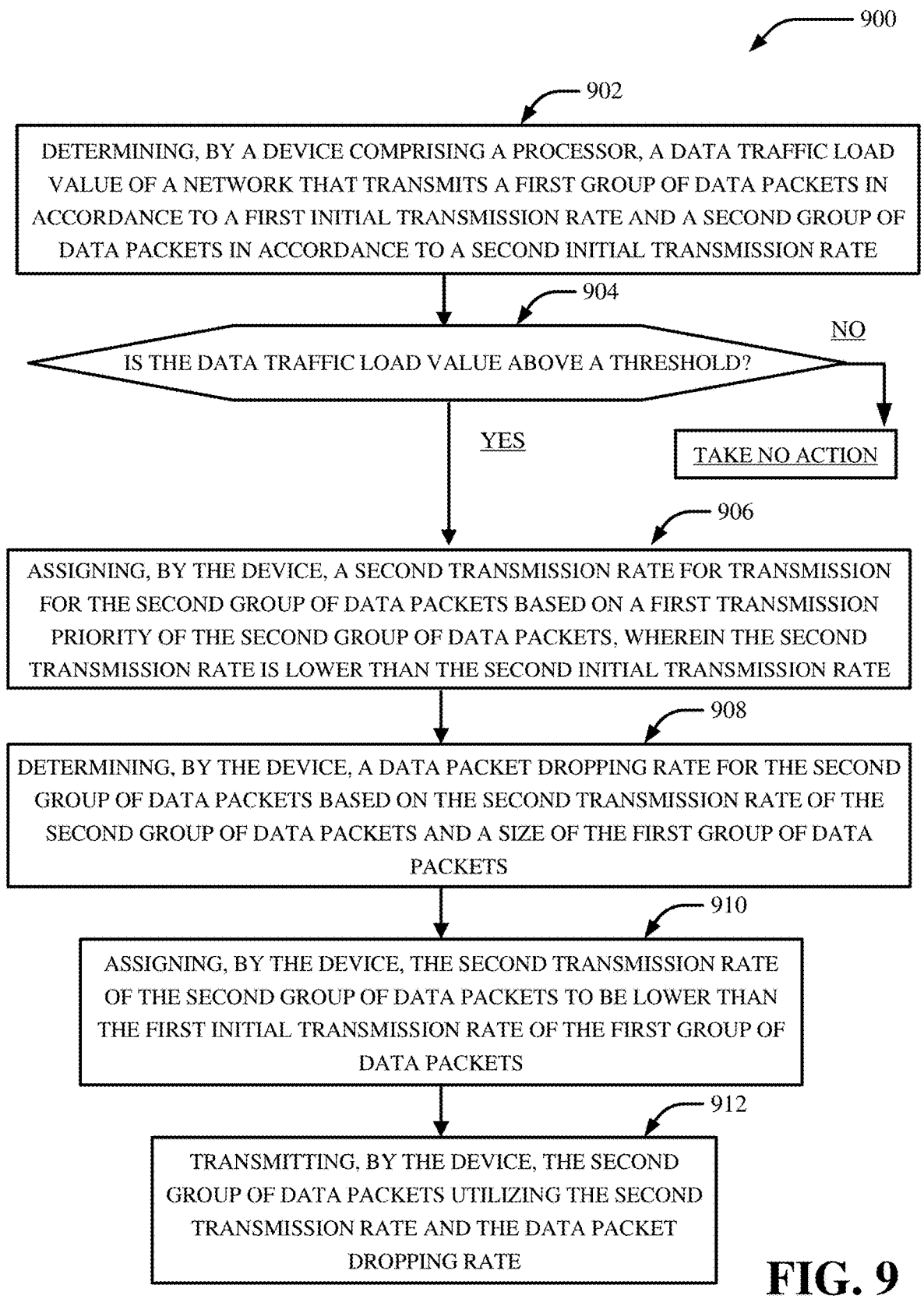
FIG. 9 depicts a diagram of an example, non-limiting computer implemented method that facilitates management of background data traffic in accordance with one or more embodiments described herein.

FIG. 9 depicts a diagram of an example, non-limiting computer implemented method that facilitates management of background data traffic in accordance with one or more embodiments described herein. In some examples, flow diagram 900 can be implemented by operating environment 1100 described below. It can be appreciated that the operations of flow diagram 900 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts determining, by a device comprising a processor, a data traffic load value of a network that transmits a first group of data packets in accordance to a first initial transmission rate and a second group of data packets in accordance to a second initial transmission rate. Operation 904 depicts determining, by the device, if the data traffic load value is above the threshold (e.g., is the data traffic load value above a threshold). If based on a first result of analyzing the data traffic load value and a threshold, determining, by the device, that the data traffic load value is above the threshold, then perform operation 906. Otherwise, take no action and continue monitoring. Operation 906 depicts assigning, by the device, a second transmission rate for transmission for the second group of data packets based on a first transmission priority of the second group of data packets, wherein the second transmission rate is lower than the second initial transmission rate. Operation 908 depicts determining, by the device, a data packet dropping rate for the second group of data packets based on the second transmission rate of the second group of data packets and a size of the first group of data packets. Operation 910 depicts in response to the determining that the data traffic load value above the threshold, assigning, by the device, the second transmission rate of the second group of data packets to be lower than the first initial transmission rate of the first group of data packets. Operation 912 depicts transmitting, by the device, the second group of data packets utilizing the second transmission rate and the data packet dropping rate.

Figure 10:
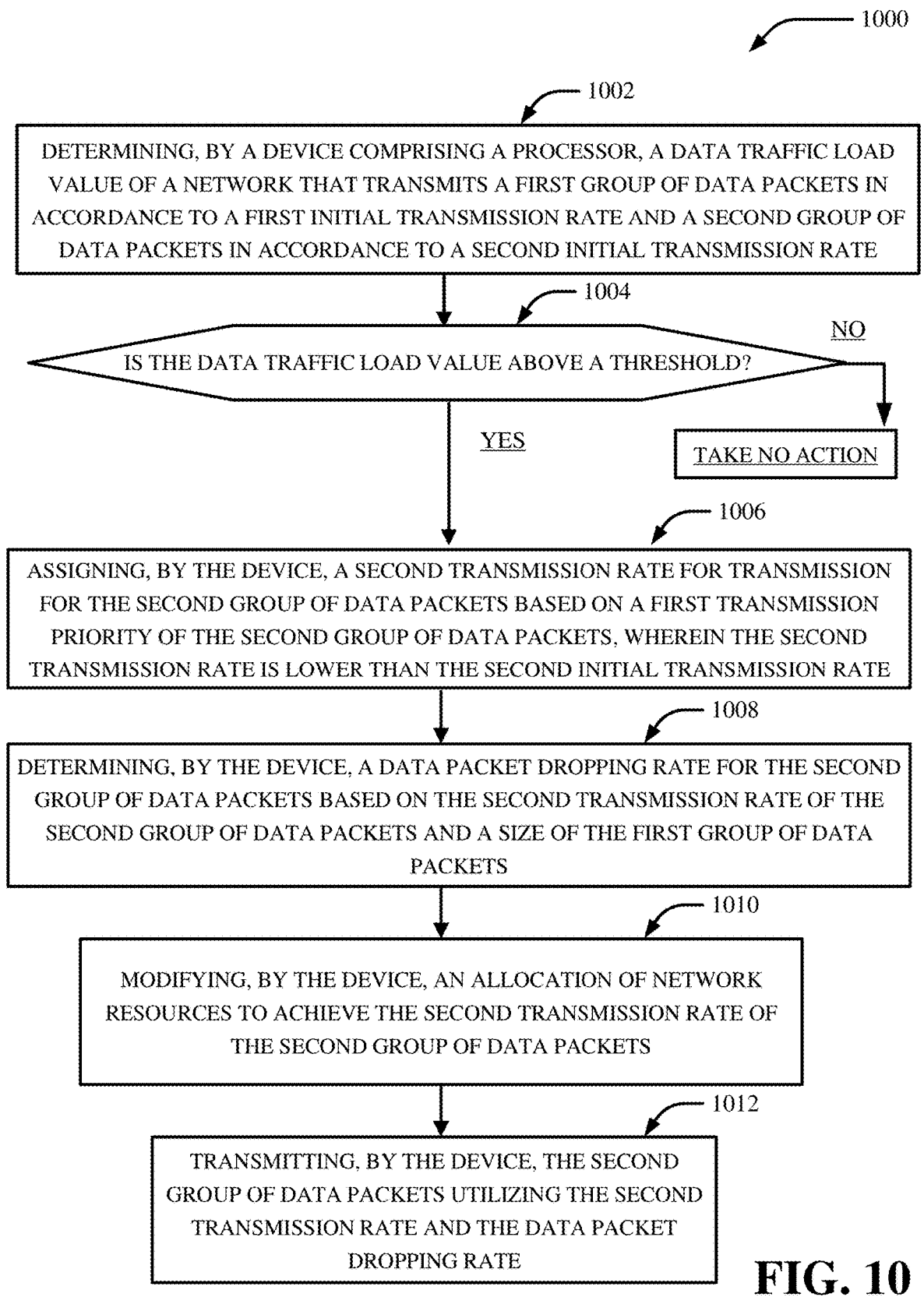
FIG. 10 depicts a diagram of an example, non-limiting computer implemented method that facilitates management of background data traffic in accordance with one or more embodiments described herein.

FIG. 10 depicts a diagram of an example, non-limiting computer implemented method that facilitates management of background data traffic in accordance with one or more embodiments described herein. In some examples, flow diagram 1000 can be implemented by operating environment 1100 described below. It can be appreciated that the operations of flow diagram 1000 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 depicts determining, by a device comprising a processor, a data traffic load value of a network that transmits a first group of data packets in accordance to a first initial transmission rate and a second group of data packets in accordance to a second initial transmission rate. Operation 1004 depicts determining, by the device, if the data traffic load value is above the threshold (e.g., is the data traffic load value above a threshold). If based on a first result of analyzing the data traffic load value and a threshold, determining, by the device, that the data traffic load value is above the threshold, then perform operation 1006. Otherwise, take no action and continue monitoring. Operation 1006 depicts assigning, by the device, a second transmission rate for transmission for the second group of data packets based on a first transmission priority of the second group of data packets, wherein the second transmission rate is lower than the second initial transmission rate. Operation 1008 depicts determining, by the device, a data packet dropping rate for the second group of data packets based on the second transmission rate of the second group of data packets and a size of the first group of data packets. Operation 1010 depicts modifying, by the device, an allocation of network resources to achieve the second transmission rate of the second group of data packets. Operation 1012 depicts transmitting, by the device, the second group of data packets utilizing the second transmission rate and the data packet dropping rate.

Figure 11:
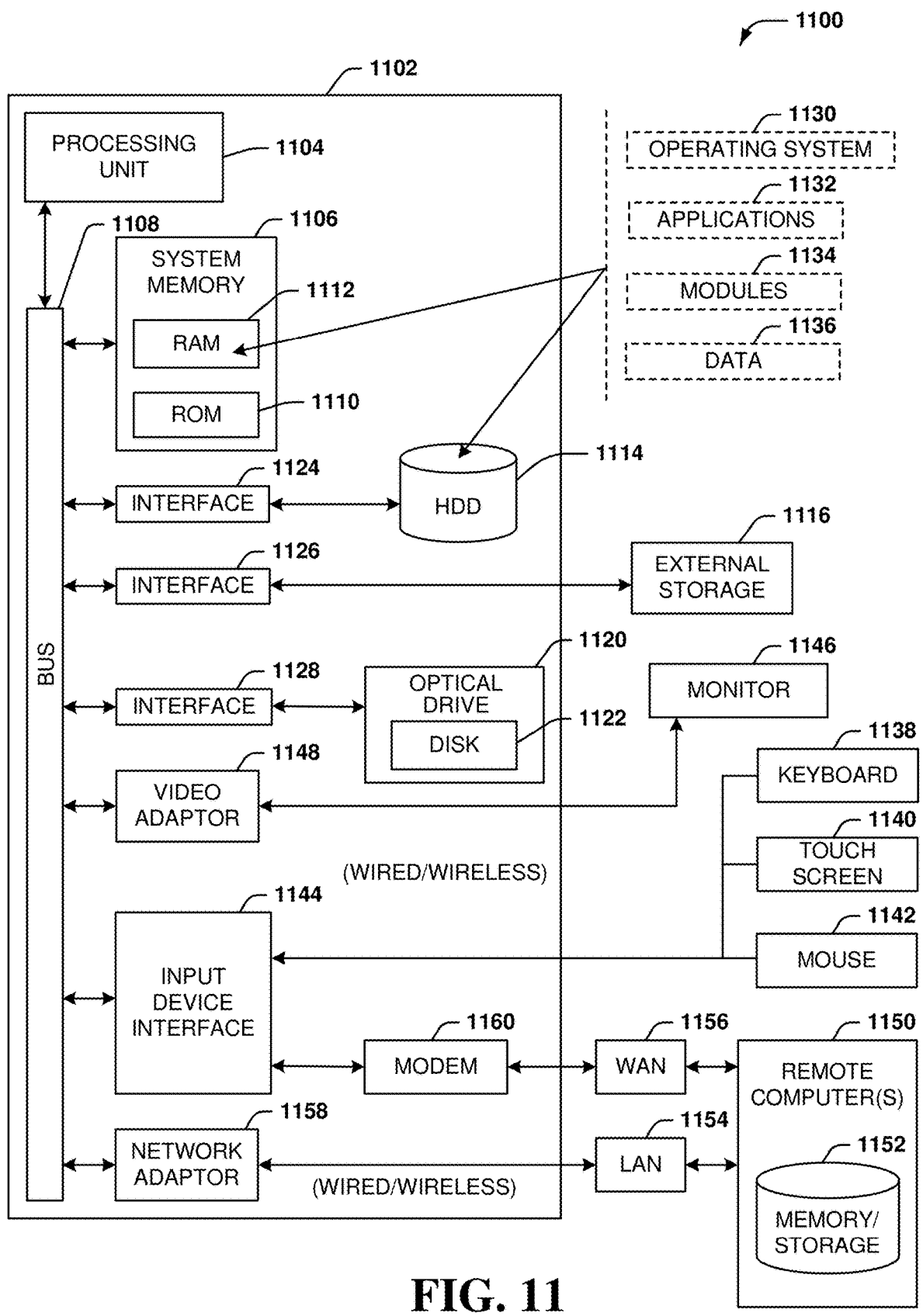
FIG. 11 illustrates an example block diagram of an example computer operable to engage in a system architecture that facilitates secure wireless communication according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server and/or communication device.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, comprising:
   detecting a congestion event in a network that transmits a first group of data packets and a second group of data packets, wherein detecting the congestion event comprises detecting the congestion event in response to a data packet throughput value of the network having been determined to have decreased below a threshold value;
   in response to detecting the congestion event, classifying the first group of data packets as a foreground flow and the second group of data packets as a background flow;
   in response to detecting the congestion event, determining a transmission rate of the second group of data packets based on a transmission priority of the second group of data packets;
   determining a data packet dropping rate for the second group of data packets based on the transmission rate of the second group of data packets and a size of the first group of data packets;
   determining a threshold packet dropping rate for the second group of data packets; and
   transmitting the second group of data packets utilizing the transmission rate and the data packet dropping rate in accordance with the threshold packet dropping rate.

2. The system of claim 1, wherein the operations further comprise:
   in response to detecting the congestion event, assigning a first transmission rate of the second group of data packets to be lower than a second transmission rate of the second group of data packets.

3. The system of claim 2, wherein the operations further comprise:
   dropping at least some data packets of the second group of data packets from the transmitting based on the data packet dropping rate to maintain the second transmission priority of the second group of data packets.

4. The system of claim 2, wherein the operations further comprise:
   adjusting an allocation of network resources to achieve the transmission rate of the second group of data packets.

5. The system of claim 1, wherein the operations further comprise:
   in response to detecting the data packet throughput value of the network has increased above the threshold value, adjusting the transmission rate of the second group of data packets.

6. The system of claim 1, wherein determining the transmission rate comprises selecting the transmission rate to avoid a data transmission timeout for the transmitting of the second group of data packets.

7. The system of claim 1, wherein the transmission rate is a first transmission rate, and wherein the operations further comprise:
   in response to detecting the congestion event, adjusting the first transmission rate of the second group of data packets to be lower than a second transmission rate of the first group of data packets; and
   dropping at least some data packets of the second group of data packets from the transmitting based on the data packet dropping rate.

8. A method, comprising:
   determining, by a device comprising a processor, a data traffic load value of a network that transmits a first group of data packets in accordance to a first initial transmission rate and a second group of data packets in accordance to a second initial transmission rate;
   based on a first result of analyzing the data traffic load value and a threshold, determining, by the device, that the data traffic load value is above the threshold,
   classifying the first group of data packets as time-sensitive data packets and the second group of data packets as time-insensitive data packets;
   assigning, by the device, a second transmission rate for transmission for the second group of data packets based on a first transmission priority of the second group of data packets, wherein the second transmission rate is lower than the second initial transmission rate;
   determining, by the device, a data packet dropping rate for the second group of data packets based on the second transmission rate of the second group of data packets and a size of the first group of data packets, wherein the data packet dropping rate is a threshold data packet dropping rate; and transmitting, by the device, the second group of data packets utilizing the second transmission rate to fulfill the threshold data packet dropping rate.

9. The method of claim 8, further comprising:
based on a second result of analyzing, determining, by the device, that the data traffic load value is below the threshold, assigning, by the device, the second initial transmission rate as the second transmission rate for transmission of the second group of data packets.

10. The method of claim 8, further comprising:
based on a second result of analyzing, determining, by the device, that the data traffic load value is below the threshold, adjusting, by the device, the second transmission rate of the second group of data packets.

11. The method of claim 8, further comprising:
dropping, by the device, at least some data packets of the second group of data packets from the transmitting based on the data packet dropping rate.

12. The method of claim 8, further comprising:
in response to determining that the data traffic load value above the threshold, assigning, by the device, the second transmission rate of the second group of data packets to be lower than the first initial transmission rate of the first group of data packets.

13. The method of claim 8, further comprising:
modifying, by the device, an allocation of network resources to achieve the second transmission rate of the second group of data packets.

14. The method of claim 8, wherein assigning the second transmission rate comprises assigning the second transmission rate to avoid a data transmission timeout for the transmitting of the second group of data packets.

15. A non-transitory machine-readable medium, comprising executable instructions that, when executed by a processor, facilitate performance of operations, comprising:
detecting a congestion event in a network that transmits a first group of data packets in accordance to a first initial transmission rate and transmits a second group of data packets in accordance to a second initial transmission rate, wherein detecting the congestion event comprises detecting the congestion event in response to a data packet throughput value of the network having been determined to have decreased below a threshold value;
in response to detecting of the congestion event, labelling the first group of data packets as a foreground flow and the second group of data packets as a background flow, and assigning a second transmission rate for the second group of data packets, wherein the second transmission rate is based on a transmission priority of the second group of data packets;
determining a data packet dropping rate for the second group of data packets based on the second transmission rate of the second group of data packets and a size of the first group of data packets, wherein the data packet dropping rate a maximum data packet dropping rate; and
transmitting the second group of data packets utilizing the second transmission rate and in accordance with the maximum data packet dropping rate.

16. The non-transitory machine-readable medium of claim 15, wherein assigning the second transmission rate for the second group of data packets comprises assigning the second transmission rate that avoids a data transmission timeout for the transmitting of the second group of data packets.

17. The non-transitory machine-readable medium of claim 15, wherein the operations further comprise:
in response to detecting the congestion event, selecting a first transmission rate of the second group of data packets to be lower than the second transmission rate of the first group of data packets; and
in response to detecting the congestion event, assigning the second transmission rate to be lower than the second initial transmission rate.

18. The non-transitory machine-readable medium of claim 15, wherein the operations further comprise:
dropping at least some data packets of the second group of data packets from the transmitting based on the data packet dropping rate; and
maintaining the second transmission rate of the second group of data packets lower than the first initial transmission rate of the first group of data packets.

19. The non-transitory machine-readable medium of claim 15, wherein the operations further comprise:
reduce a network resource allocation to achieve the second transmission rate of the second group of data packets.

20. The non-transitory machine-readable medium of claim 15, wherein assigning the second transmission rate comprises assigning the second transmission rate that prevents a data transmission timeout for transmitting the second group of data packets.

* * * * *